(12) United States Patent
Po-Hei

(10) Patent No.: US 6,252,204 B1
(45) Date of Patent: Jun. 26, 2001

(54) SAFETY DEVICE FOR ELECTRIC COOKING APPARATUS

(75) Inventor: Lam Po-Hei, Kowloon (HK)

(73) Assignee: Poking Industrial Company Ltd. (CN)

( * ) Notice: Subject to any disclaimer, the term of this patent is extended or adjusted under 35 U.S.C. 154(b) by 0 days.

(21) Appl. No.: 09/670,879

(22) Filed: Sep. 27, 2000

(51) Int. Cl.⁷ .............................. H05B 3/68; A47J 37/08
(52) U.S. Cl. ........................................ 219/450.1; 99/400
(58) Field of Search ................................ 219/450.1, 451.1, 219/452.11, 455.11, 455.12, 541; 439/135, 136, 142, 143; 99/378, 400, 444, 446

(56) References Cited

U.S. PATENT DOCUMENTS

| | | |
|---|---|---|
| 1,330,877 | 2/1920 | Kuhn et al. . |
| 3,068,442 * | 12/1962 | Kubik et al. ........................ 439/136 |
| 4,528,429 | 7/1985 | Dobson et al. ...................... 200/50 |
| 4,650,268 | 3/1987 | Dobson et al. ...................... 339/43 |
| 4,952,755 * | 8/1990 | Engel et al. ........................ 439/136 |
| 5,477,010 | 12/1995 | Buckshaw et al. ................... 174/67 |
| 5,504,295 | 4/1996 | Collas et al. ....................... 219/443 |
| 5,513,999 | 5/1996 | Fry et al. ........................... 439/188 |
| 5,524,528 | 6/1996 | Yeh ................................... 99/446 |
| 5,546,851 * | 8/1996 | Goto .................................. 99/446 |
| 5,839,909 | 11/1998 | Calderara et al. .................. 439/137 |
| 6,064,042 * | 5/2000 | Glucksman et al. ............. 219/452.13 |

* cited by examiner

*Primary Examiner*—Sang Paik
(74) *Attorney, Agent, or Firm*—Peter S. Canelias

(57) ABSTRACT

The invention relates to a safety device, particularly a locking mechanism for safe operation of an electric grill. The preferred embodiment is an electric cooking apparatus comprising a molded plastic base, a removable metal drip pan adapted to rest within the base and be supported by the base, a grill plate for cooking foods placed above the pan, where the grill plate contains bars and slots which, respectively, cook the food placed on the grill plate and allow drippings to pass through the grill plate to be captured on the drip pan without contacting the plastic base, an electric, resistance-type heater preferably disposed beneath the grill plate for heating the grill plate, and sheathed or case within the grill plate, and a combination thermo-probe and temperature detector with thermostat for supplying power to the electric heater, and for engaging a safety lock actuator lever and pin hook which allow the unit to operate.

18 Claims, 7 Drawing Sheets

SAFETY DEVICE FOR ELECTRIC COOKING APPARATUS

FIELD OF THE INVENTION

The invention relates to a safety device for use with an electric food cooker, particularly a locking mechanism for safe operation of an electric grill. The preferred embodiment is an electric cooking apparatus comprising a molded plastic (phenolic resin or other thermosetting composition) base, a removable metal drip pan adapted to rest within the base and be supported by the base, a grill plate for cooking foods in a position above the drip pan, where the grill plate contains bars and slots which, respectively, cook the food placed on the grill plate and allow drippings or juices from the cooked food to pass through the grill plate, to be then captured on the drip pan without contacting the plastic base. The preferred embodiment also comprises an electric, resistance-type heater preferably disposed beneath the grill plate for heating the grill plate, the resistance heating element being sheathed or otherwise protected from the drippings from the cooked food, or cast within the grill plate, and a combination thermo-probe and temperature detector with thermostat for supplying power to the electric heater, and for engaging a safety lock actuator lever and pin hook which allow the unit to operate.

BACKGROUND OF THE INVENTION

Food cooking devices of the grill type are divided into three general categories. The first employs charcoal burning to generate heat to grill foods placed on a grilling surface above the charcoal. The second utilizes gas, such as liquidized petroleum gas or propane, to supply heat. The third employs electricity to heat a grilling surface, usually in the form of an electric resistance heater. The present invention concerns the third category, namely electric cooking appliances for the grilling of food, although the invention may be employed in other electric cooking devices such as ovens or steamers, as will become apparent in the description below.

One of the major drawbacks of electric cooking appliances is that power may be supplied to a heater (usually a resistance-type heater) in the absence of safe operating conditions. For example, during use of the apparatus, the user may inadvertently turn on the electric heater and heat the grill plate, but without properly installing a drip pan or other means for catching hot drippings from the cooked food or means for deflecting heat upwards and away from the working surface on which the apparatus rests. As a result, when power is supplied to the heater and the foods are cooked, the hot drippings flow downward through the grill plate and onto the working surface on which the apparatus rests. The working surface may also be severely damaged by heat radiating from the heater, and can even catch fire depending upon the materials of which it is composed or the amount of fats and oils contained in the hot drippings.

Portable grill units often have a supporting base upon which the grill plate is designed to rest. Where the supporting base is composed of metal, metal alloy, or of a plastic or composite which resists very high temperatures associated with cooking or grilling food, a drip pan is optional. For example, in the charcoal type of griller, many embodiments do not employ a drip pan, allowing instead for the drippings to pass through the grill plate and directly onto the charcoal.

However, it is both economical and easier to manufacture a supporting base of plastic material which does not continuously resist the high temperatures generated to cook or grill food. Use of a supporting base in combination with a drip pan for catching hot drippings and possibly for deflecting heat away from the supporting base is advantageous in this type of device.

However, in an electrically heated device where a plastic supporting base is used, there are additional safety hazards. For example, the appliance may be inadvertently turned on where the supporting base is not properly positioned, or even absent entirely, endangering the user as well as damaging the base (and possibly the working surface on which the base rests). And, where the appliance is designed to be used with a combination of a drip pan and supporting base, the user may inadvertently turn on the electric heater and heat the grill plate, but without properly installing a drip pan or other means for catching hot drippings from the cooked food or means for deflecting heat upwards and away from the supporting base. As a result, when power is supplied to the heater and the foods are cooked, the hot drippings flow downward through the grill plate and onto the base, thus possibly damaging the base and creating a fire hazard. The base may also be severely damaged by heat radiating from the heater, and can even catch fire from such radiant heat, depending upon the materials of which it is composed or the amount of fats and oils contained in the hot drippings.

SUMMARY OF THE INVENTION

The invention has for its object to remove the risks described above in connection with the operation of an electric grill unit. In an apparatus according to the invention, a grill plate and a supporting base are locked together in the correct position for operation of the unit;

Another object of the invention is to provide a electric grill unit in which a grill plate, a drip pan, and a supporting base are locked together in the correct position for operation of the unit;

Another object of the invention is to provide an electric grill with a molded plastic base which supports a drip pan in the proper position to catch drippings from the cooked food and prevent damage to the plastic base by the hot drippings and radiant heat;

Another object of the invention is to provide an electric grill where the user cannot remove the grill plate when power is being supplied to the unit;

Another object of the invention is to provide an electric grill which will not operate without the drip pan in proper position within the base;

Another object of the invention is to provide an electric grill which prevents damage to the molded plastic base where the drip pan is not in proper position within the base;

Another object of the invention is to accomplish the above objects by means of a thermo-probe which allows the supply of electric power to the unit, while mechanically engaging the locking mechanism to hold the base, drip pan and grill plate in correctly positioned engagement;

Another object of the invention is to provide a locking mechanism which contains a sliding door built into the handle of the grill plate, where the locking mechanism rests in the locked position with the sliding door preventing insertion of the thermo-probe Another object of the invention is to accomplish the above objects by means of a locking and engagement assembly where the grill plate and either or both of the base and drip pan must be in proper alignment with respect to one another and thereby exposing an opening shaped to accept the insertion of the thermal probe which allows the supply of electric power to the unit;

Another object of the invention is to provide a lever in the base having one substantially horizontal end and one offset end, the lever engages at the horizontal end with the drip pan so that the horizontal end is depressed and the offset end elevated to lift the sliding door mechanism, which allows insertion of the thermo-probe into the handle of the grill plate In view of these objects and characteristics, it will be understood that to operate a preferred embodiment of the invention, the presence of the base, and the drip pan, as well as the correct positioning of the base, and the pan, as well as the correct positioning of the handle on the grill plate, will be necessary. Once correct positioning is obtained for these three elements, insertion of the thermo-probe into the handle of the grill plate is possible, and once inserted, locks the assembly into position unless and until the thermo-probe is removed.

BRIEF DESCRIPTION OF THE DRAWINGS

The characteristics and advantages of the invention will become apparent from the description which follows, by way of non-limiting example, with reference to the accompanying drawings, in which.

DETAILED DESCRIPTION OF THE INVENTION

Figure 1:
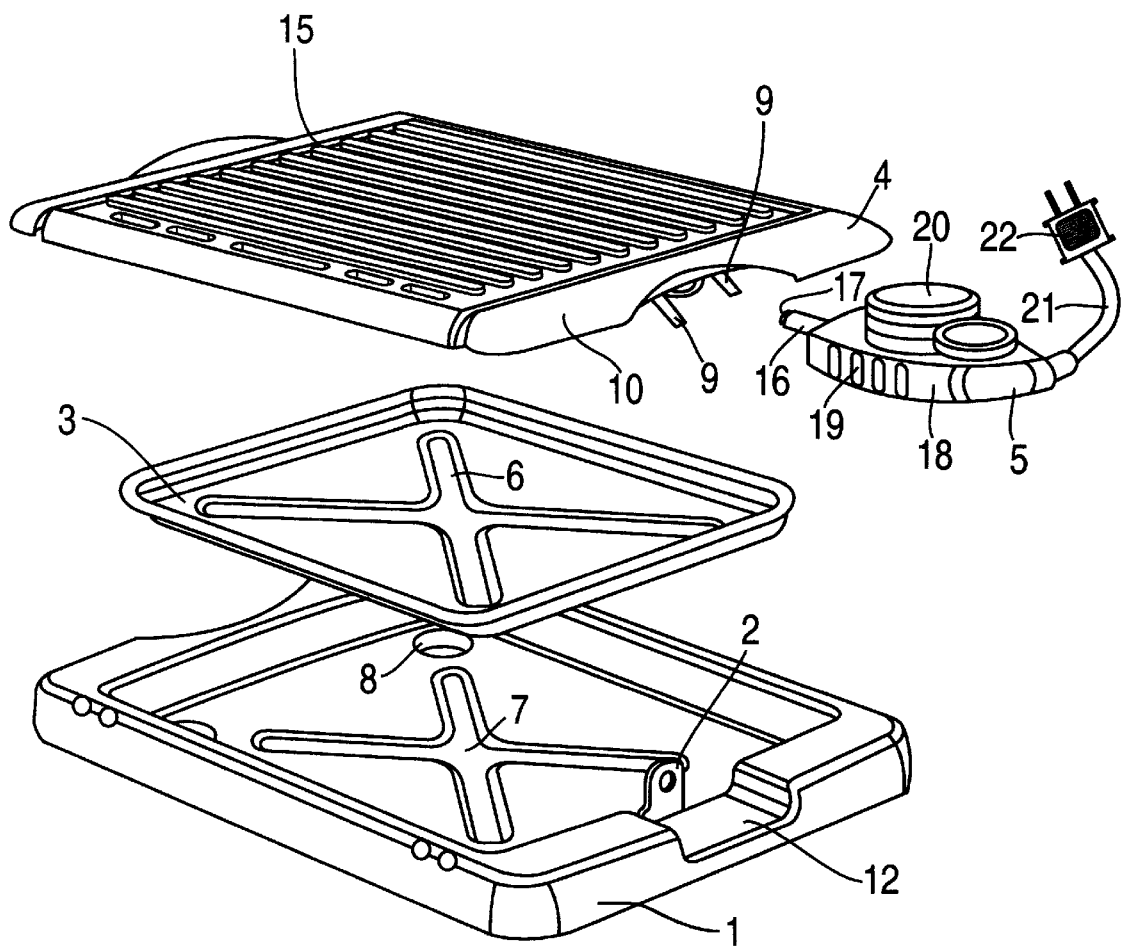
FIG. 1 is an exploded perspective view of a preferred embodiment of the invention.

The indoor grill apparatus shown in FIG. 1 is a grill of the compact, horizontal type in accordance with a preferred embodiment of the invention wherein a grill plate is used in connection with a drip pan and supporting base. The grill comprises a base 1 having the shape of a frame, made of plastic material. The base 1 preferably has a plurality of perforations in the bottom surface (not shown) so as to save on the cost of the plastic material used to form the base 1. The grill apparatus also has a removable metal pan 3 adapted to rest on the inner bottom surface of the base 1, and is positioned within the base by a stamped "X" shaped embossing 6 in the pan 3. The convex bottom of the embossing 6 is dimensioned to be slightly smaller in respect to a corresponding embossing 7 in the bottom of the base 1. When the drip pan 3 is disposed within the base 1, the convex lower surface of embossing 6 nests within the concave upper surface of embossing 7 in the base 1. At the four end points of embossing 6 there are, on the bottom surface, four protrusions (not shown) which engage corresponding cavities 8 formed in the base 1 which further stabilize the position of the drip pan 3 in the base 1. The convex lower surface of the cavities 8 form four feet in the bottom of the base 1 to rest upon a supporting surface.

Figure 2:
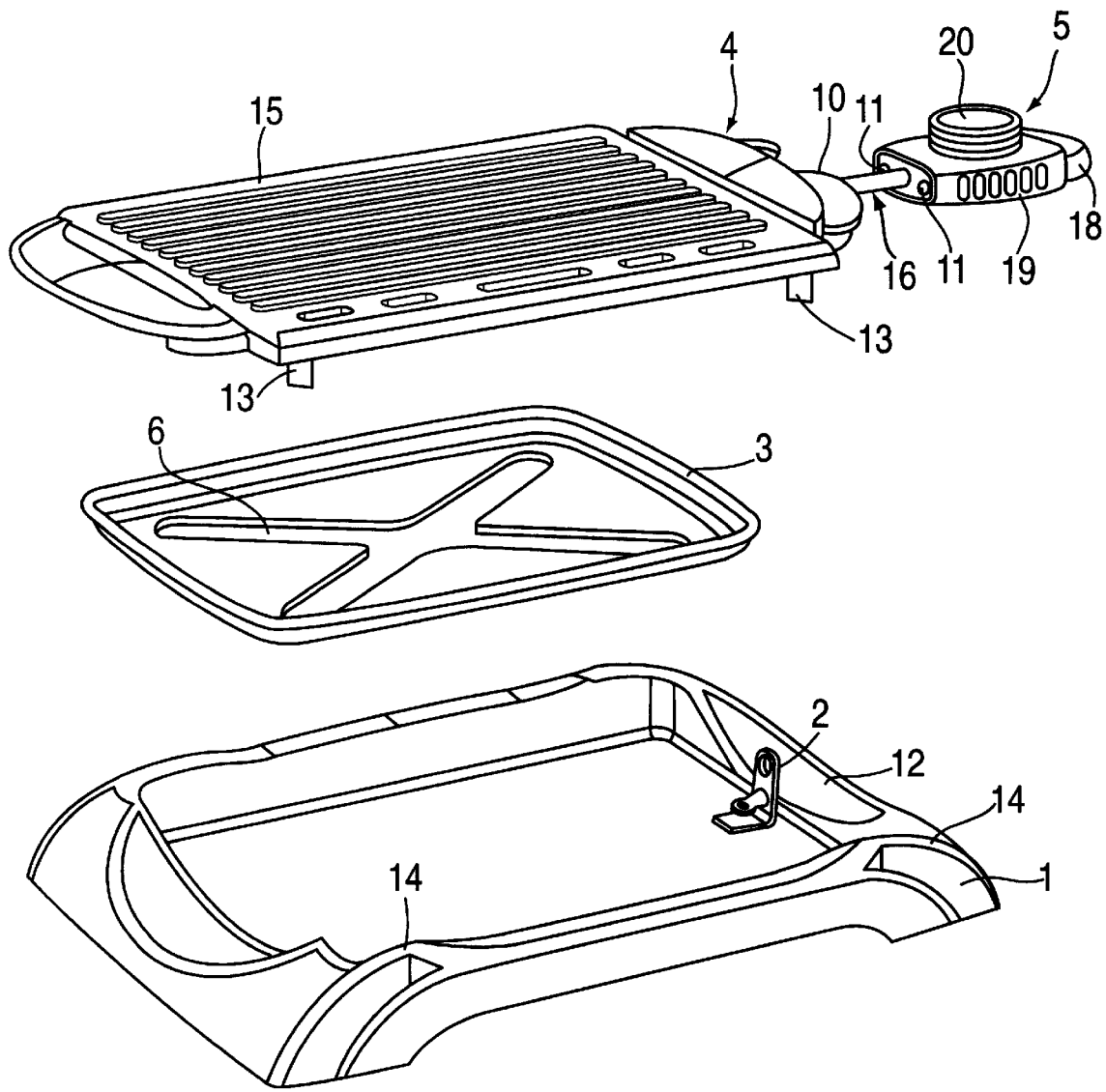
FIG. 2 is a view analogous to FIG. 1 in which the placement of the safety lock actuator and lever are shown.

A cooking grill plate 4 is disposed over the drip pan 3 for grilling and cooking the food placed above the pan 3, and is supported by four legs 13, FIG. 2, which engage corresponding slots formed in the base 1. The grill plate 4 is formed from a metal material which transmits heat, preferably aluminum or aluminum alloy. The upper surface of the grill plate 4 has bars 15 and slots 15a, FIG. 8, the bars 15 for grilling food and the slots for allowing drippings to pass through the grill plate 4 and into drip pan 3. The bottom of grill plate 4 has an electric heating resistance 36 of the shielded resistance type shaped along a sinuous path, and is preferably cast within the grill plate 4. The electric resistance heater 36 is maintained in sufficiently close proximity to the grill plate 4 so as to permit the transfer of heat from the resistance heater 36 to the grill plate 4 and to the bars 15 for cooking food. The ends of the electric resistance heater are mounted in a hollow handle portion 10 of grill plate 4, and terminate in two male leads 9 in the form of pins, which extend outward from a facing surface 35, FIG. 7, of the handle portion 10, and are adapted to mate with corresponding female sockets 11, FIG. 2, in the thermo-probe assembly 5. The hollow handle 10 is formed of thermosetting compositions, preferably phenolic resins (thermosetting). Power is supplied to the electric resistance heater through the male leads 9, which are connected to an electrical supply source by means of the thermo-probe assembly 5. The handle 10 is adapted to rest in a recess 12 provided in a portion of the frame of the base 1 and has a shape complementary to the recess so as to occupy a particular position when seated.

Figure 4:
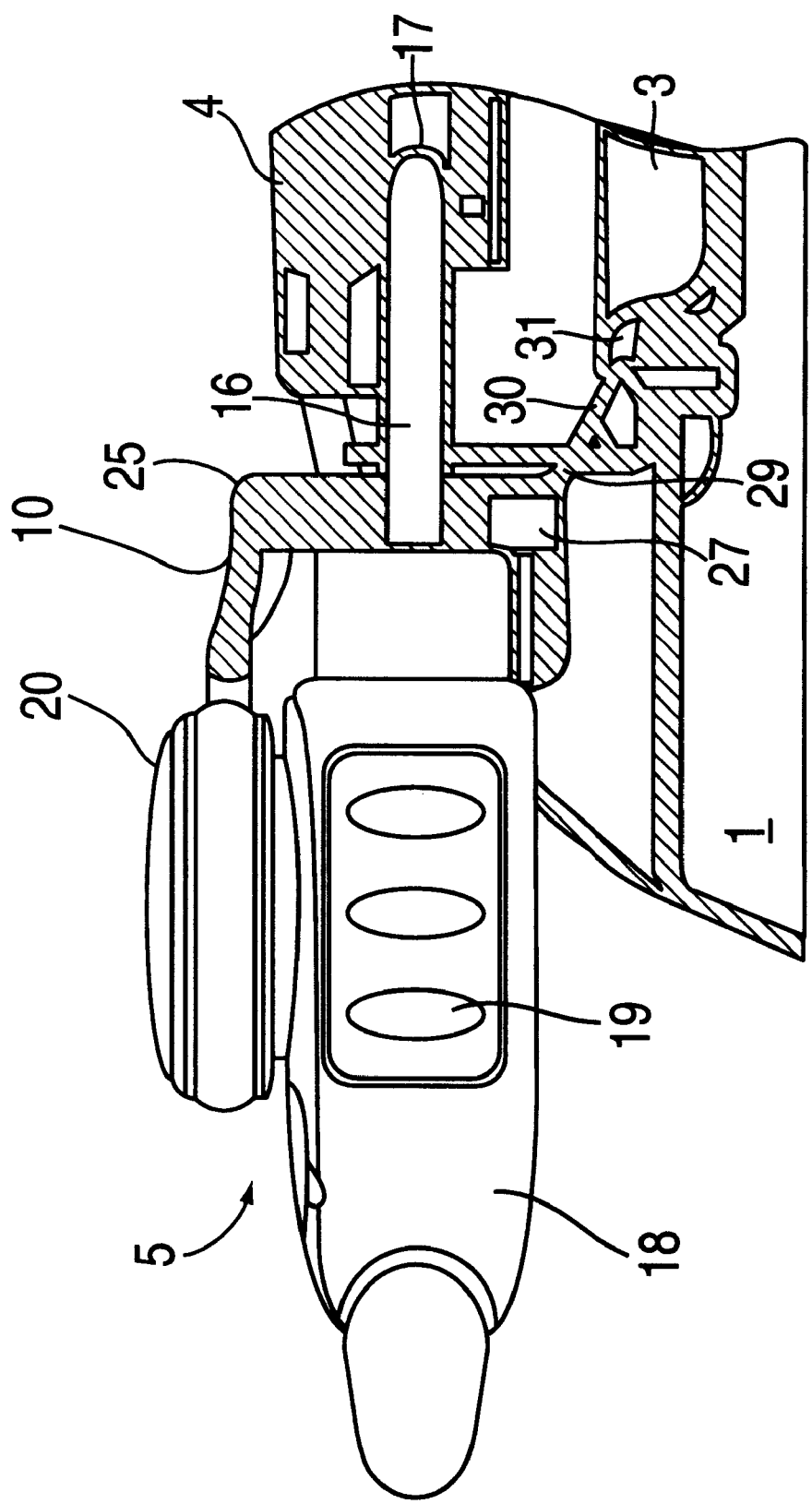
FIG. 4 is partial section view showing the assembled apparatus with lock open.
Figure 5:
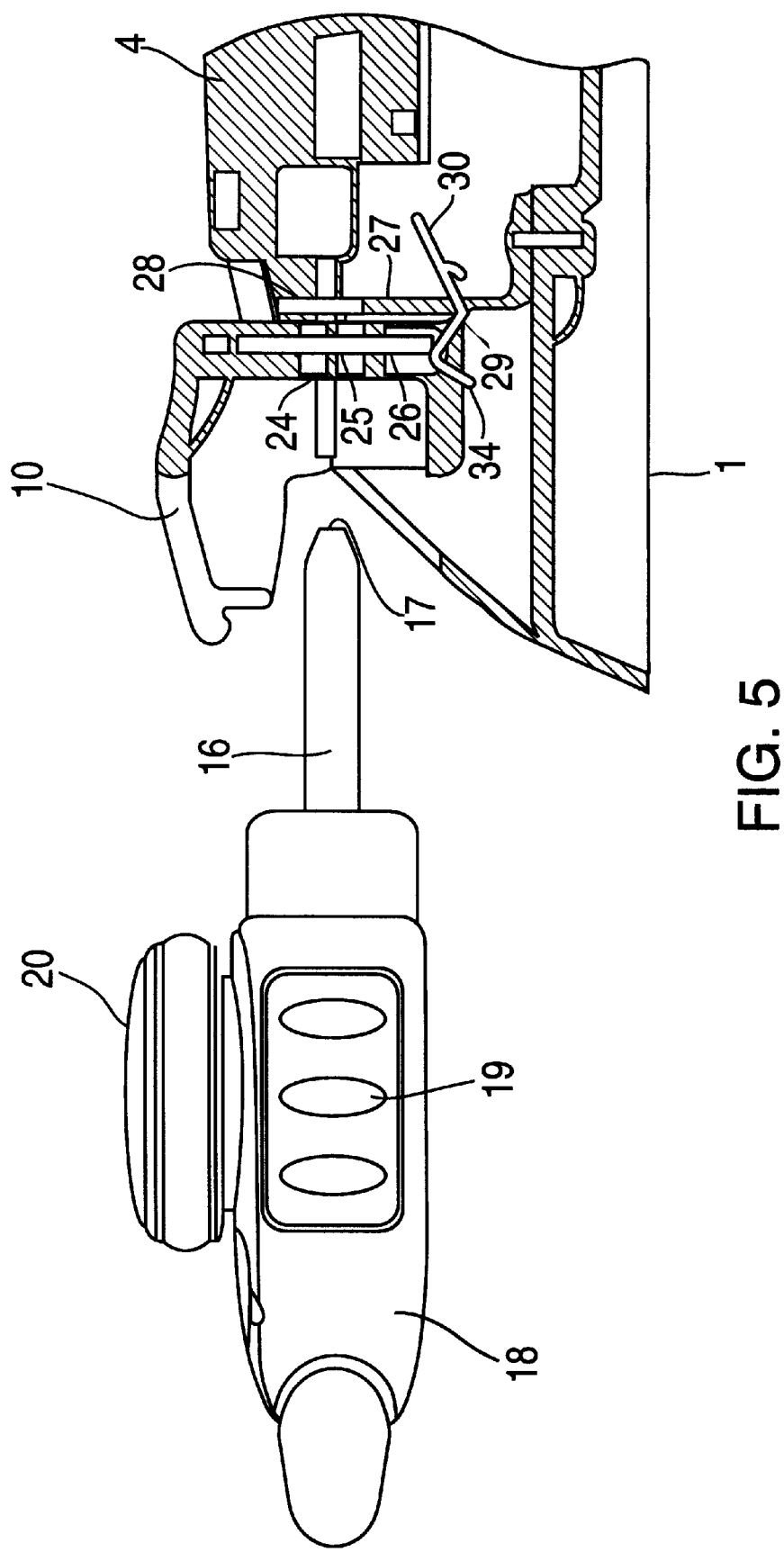
FIG. 5 is a partial section view showing the lock engaged.

As more clearly seen in FIGS. 3, 4 and 5 and according to the invention, the thermo-probe assembly 5 has a thero-probe 16, preferably of a cylindrical shape terminating in a point 17, for engaging the locking mechanism described below. The tip 17 and substantially cylindrical shape allow for easy insertion of the thermo-probe into the locking mechanism. Note that, despite the term "thermo-probe" used herein, a member having the mechanical properties of the thermo-probe; i.e., a member capable of passing through the openings comprising the locking mechanism, will perform the same function of locking the unit as will the thermo-probe. The thermo-probe 16 and thermo-probe assembly 5 are disclosed herein as a preferred embodiment, and not a limitation on the scope of the invention.

The thermo-probe assembly has a plastic housing 18, preferably formed by a thermosetting composition, which comprises a plurality of ridges 19 on each side of housing 18 for grasping and manipulating the thermo-probe assembly 5. The thermo-probe assembly 5 contains a thermostat and temperature adjustment knob 20, which has indicia indicating temperature of the grill plate 4, and which allows the user to select the temperature at which the grill plate 4 is heated. To that end, the thermo-probe 16 is temperature sensitive; heat sensed by the thermo-probe 16 is transmitted to the thermostat and adjustment knob 20 so that the supply of current to the resistance heater is turned on or off depending on the setting of the knob 20 and the heat sensed by the thermo-probe 16. Power to the resistance heater on the underside of the grill plate 4 is supplied through the thermo-probe assembly by means of a conventional cord 21, FIG. 1, and socket plug 22, FIG. 1. There is preferably contained within the housing 18 of thermo-probe assembly 5 an indicator light 23, FIG. 3, which is illuminated when power is supplied from the cord 21 to the thermo-probe assembly 5.

Figure 6:
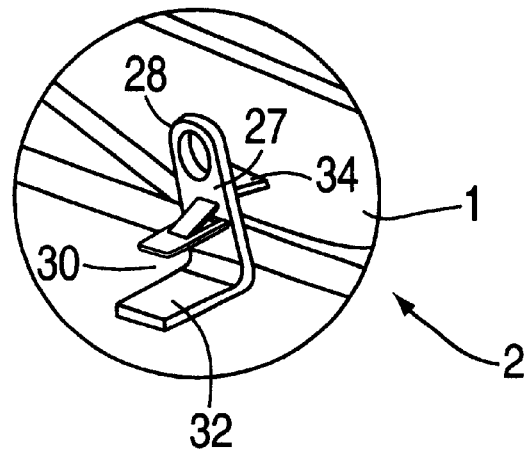
FIG. 6 is a view of the safety lock actuator lever and pin hook shown in FIG. 2.
Figure 7:
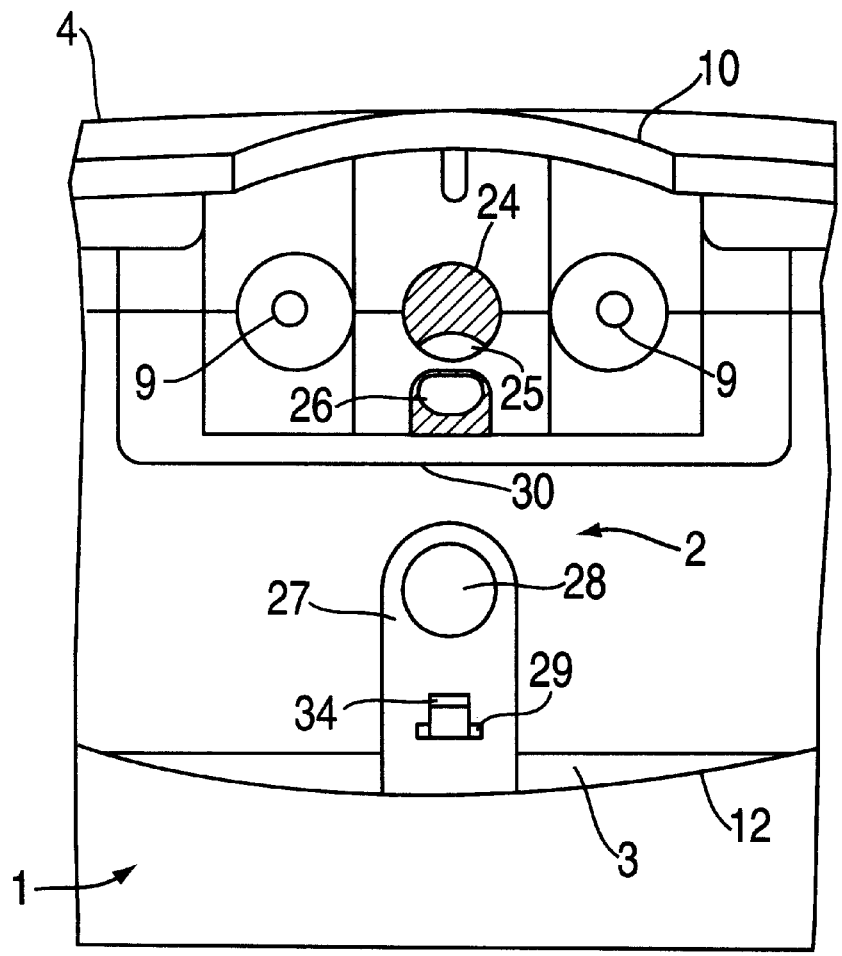
FIG. 7 is an exploded side view of the components of the locking assembly.
Figure 8:
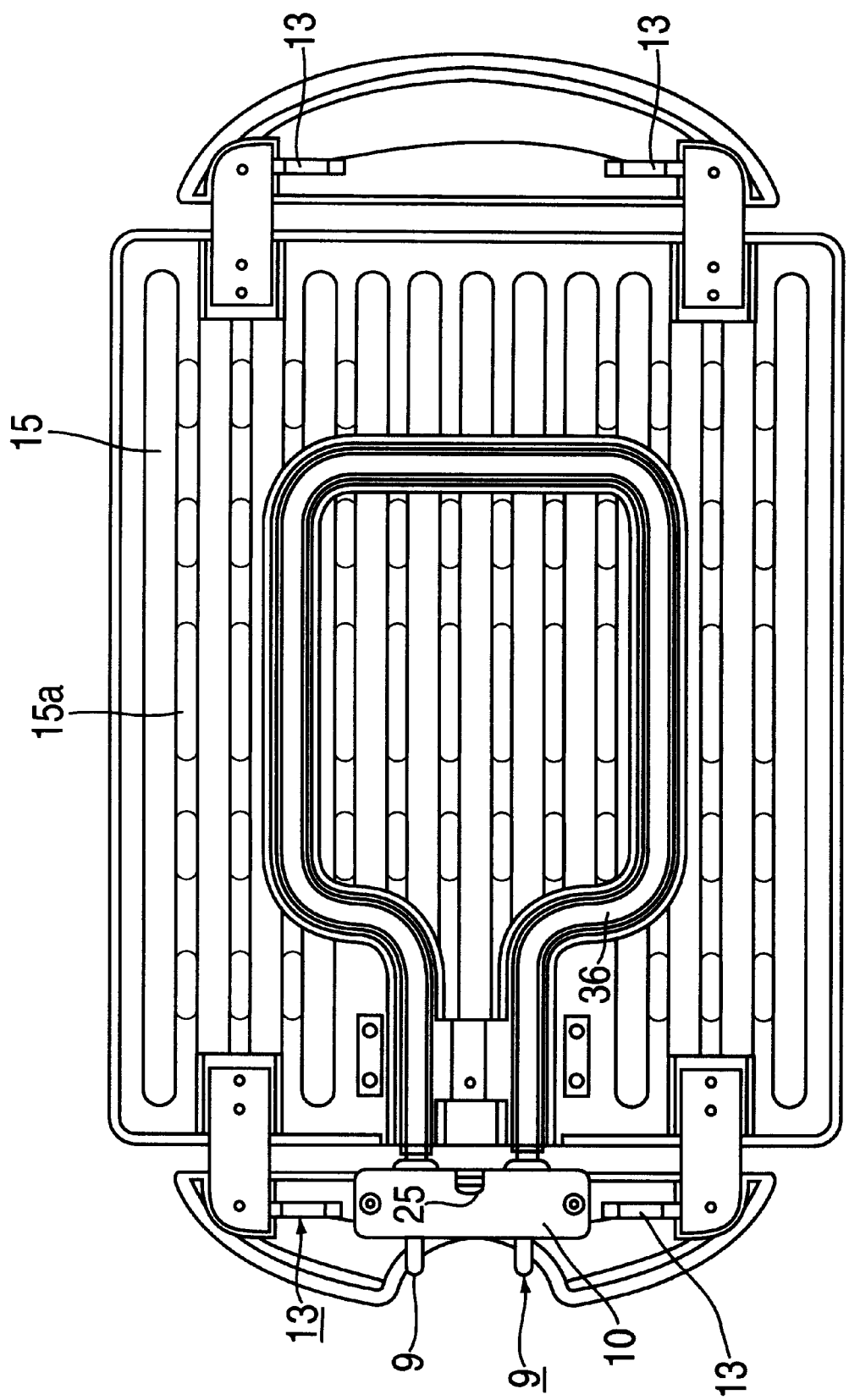
FIG. 8 is a bottom plan view of the grill plate.

In FIG. 7, the locking engagement of the components of the grill apparatus is shown. In the handle portion 10 of the grill plate 4, the male leads 9 are disposed on either side of a circular opening 24, which is of slightly greater diameter than that of the cylindrical thermo-probe 16, which allows mating engagement of the thermo-probe 16 into the opening 24. Immediately behind the opening 24 is a moveable door 25, herein shown in a sliding engagement and referred to as sliding door 25, preferably formed of metal or metal alloy, which partially blocks opening 24. It will be apparent to those of skill in the art that the door may be movable in a hinged or pivoting manner, in addition to the preferred sliding door described herein. The sliding door 25 has a circular opening 26, of substantially the same diameter as that of opening 24 in the handle 10. The safety lock actuator 27 has a circular opening 28, of substantially the same diameter as that of opening 24 and opening 26. The safety lock actuator 27, preferably formed of metal or metal alloy, is secured to the base 1 by means of an L portion 32, FIG. 6, which is anchored by screws 33, FIG. 3.

Figure 3:
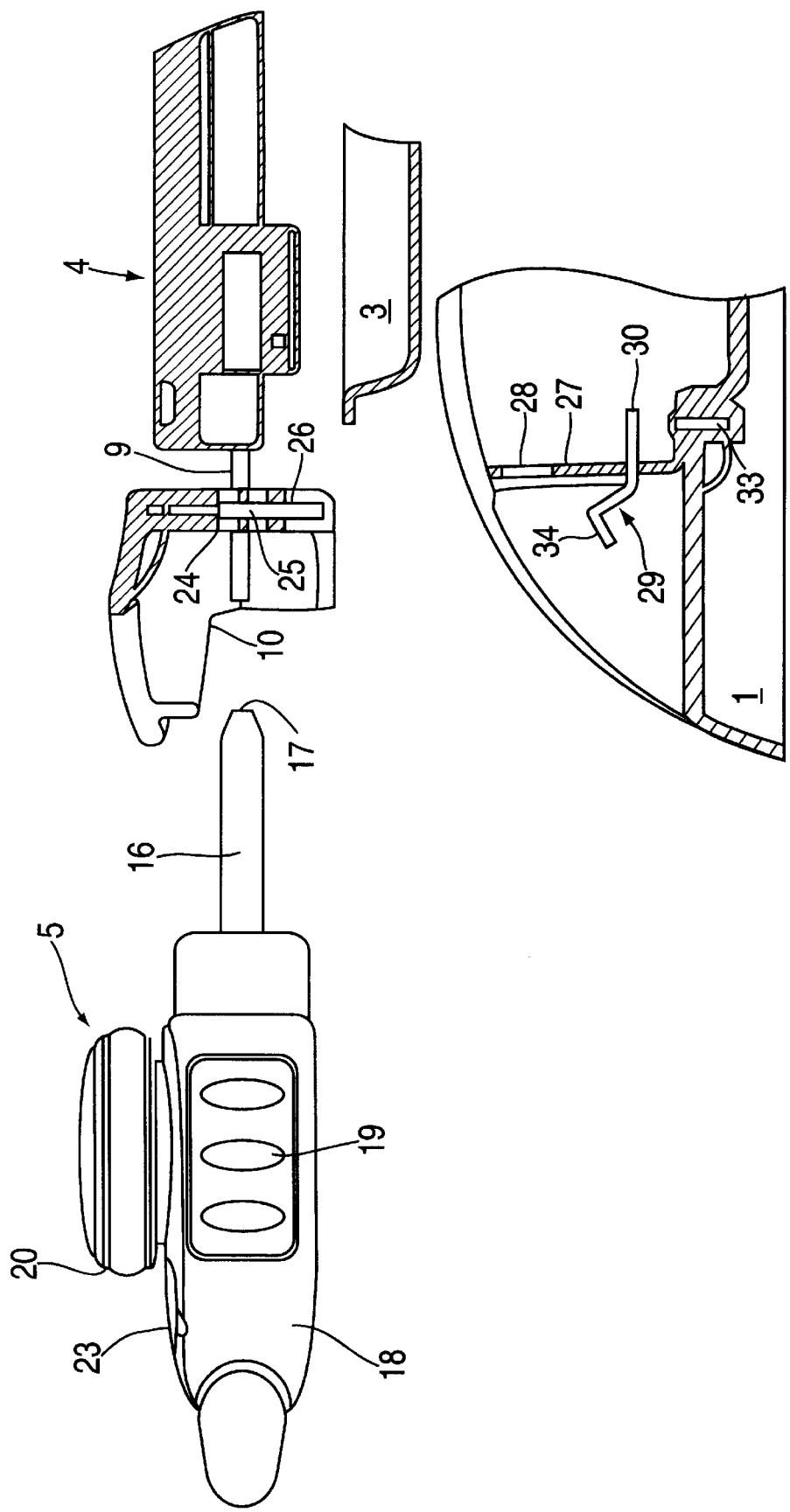
FIG. 3 is an exploded partial section view.

The safety lock assembly 2 has a pin hook 29, FIG. 3, preferably formed of metal or metal alloy, which is designed to engage the bottom edge 30 of sliding door 25. When the grill plate 4 is properly nested above the drip pan 3 in base 1, the pin hook 29 or lock lever, engages and elevates the sliding door 25 so that the opening 26 of sliding door 25 is aligned with opening 24. The pin hook 29 is in the form of a lever which passes through the safety lock actuator 27, so as to be pivotably mounted on the safety lock actuator 27. The rearward horizontal portion 30, FIG. 3 and FIG. 6, is adapted to be depressed by the drip pan 3, so as to elevate the opposite end of pin hook 29 in a proper position to elevate the sliding door 25 so that the opening 26 of sliding door 25 is in alignment with opening 24 in handle 10. The engagement end 34 of pin hook 29, FIG. 5, is hooked or offset so as to capture the lower edge 30 of sliding door 25. If the drip pan is not in proper position, the lip of the grill pan 31, FIG. 4, will not engage the horizontal lever portion 30 of pin hook 29, and thus the pin hook 29 will not be of sufficient elevation to allow the engagement end 34 to raise the sliding door 25 into position where the opening 26 in the sliding door 25 will conform with the opening 24 in the handle 10. The safety lock actuator 27, which is attached to the base 1, slides into the handle 10 behind sliding door 25 until the opening 28 is in alignment with opening 24 and opening 26.

In FIG. 3 it can be seen that when the three openings 24, 26 and 28 are in alignment, the thermo-probe 16 is inserted through the openings and pressed into engagement with the handle 10 so that male leads 9 enter female sockets 11 in the thermo-probe assembly 45. Thus, an electrical circuit is completed, and the thermo-probe 16 locks the three constituent components, the grill plate 4, the drip pan 3 and the base 1, together in proper configuration.

Thus, thanks to this construction, there is obtained a safety lock assembly which prevents any improper operation of the apparatus the actuation of the power supply to the unit is dependent on the mechanical alignment of the grill plate 4, the base 1 and the drip pan 3, where the drip pan 3, by means of lip 31, depresses the lever portion 30 of the pin hook 29 which elevates the engagement end 34 of pin hook 29, which in turn engages the lower edge 30 of sliding door 25 to raise sliding door 25 so that opening 26 is in alignment with opening 24. At the same time, safety lock actuator 27, to which the pin hook 29 is pivotably attached, inserts into handle 10 behind sliding door 25 until opening 28 is in alignment with opening 24 and opening 26.

It would be apparent to those skilled in the art that another type of cooking surface or plate, such as a flat, convex, concave or ridged pan or other type of cooking plate, could be employed as the grill plate described above, without departing from the present invention. There are known in the art different cooking surfaces which may be employed using the present invention, even those cooking surfaces that do not directly contact the food to be cooked. The shape or type of cooking plate is not a limitation of the present invention, nor is the term "plate" limiting as to the overall shape of the cooking surface.

As to the term "drip pan," the term is herein defined to be a pan of any shape, as long as the drip pan is so configured to depress the lever to bring the openings into alignment. Where no perforations are formed in the cooking plate, the drip pan may be safely eliminated. Where the drip pan is eliminated, it also would be apparent to those skilled in the art that the invention may be usefully employed in an electric cooker where the cooking surface itself, whether a grill plate or other cooking surface, is adapted to depress the lever portion in the absence of a drip pan, rather than resting on the base without contacting the lever, thus allowing the benefits of the safety device of the present invention to be derived in an appliance wherein the drip pan is not utilized.

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:

1. An electric cooking apparatus comprising a base and a cooking plate adapted to rest within the base, where the cooking plate is used for cooking food, and an electric heater for heating the cooking plate;

the cooking plate having a first opening;

and having a moveable door on one end of the cooking plate;

the moveable door having a second opening formed therein;

the base having a lock actuator;

the lock actuator having a third opening;

and the base having a lever, so that the cooking plate depresses one end of the lever, and the other end of the lever moves the door so that the second opening is brought into alignment with the first opening.

2. An electric cooking apparatus according to claim 1, further comprising a locking member insertable through the first, second and third openings when the openings are in alignment, so as to lock the base and cooking plate into position with respect to one another.

3. An electric cooking apparatus according to claim 2, wherein the locking member is substantially cylindrical.

4. An electric cooking apparatus according to claim 2, wherein the locking member is a thermo-probe, and further comprising a thermostat where the thermo-probe functions as a temperature sensor.

5. An electric cooking apparatus according to claim 4, where the thermostat has a housing, the housing having a plurality of ridges to aid the user in grasping and manipulating the housing.

6. An electric cooking apparatus according to claim 1, wherein the lever is a pin hook.

7. An electric cooking apparatus according to claim 1, wherein the electric heater is a resistance heater.

8. An electric cooking apparatus according to claim 7, where the electric resistance heater is cast within the cooking plate.

9. An electric cooking apparatus according to claim 1, wherein the moveable door is slidable.

10. An electric cooking apparatus comprising a base, a cooking plate and a drip pan adapted to rest within the base, where the cooking plate is used for cooking food, and an electric heater for heating the cooking plate;

the cooking plate having a first opening;

and having a moveable door on one end of the cooking plate;

the moveable door having a second opening formed therein;

the base having a lock actuator;

the lock actuator having a third opening;

and the base having a lever, so that the drip pan depresses one end of the lever, and the other end of the lever moves the door so that the second opening is brought into alignment with the first opening.

11. An electric cooking apparatus according to claim 10, further comprising a locking member insertable through the first, second and third openings when the openings are in alignment, so as to lock the base and cooking plate into position with respect to one another.

12. An electric cooking apparatus according to claim 11, wherein the locking member is substantially cylindrical.

13. An electric cooking apparatus according to claim 11, wherein the locking member is a thermo-probe, and further comprising a thermostat where the thermo-probe functions as a temperature sensor.

14. An electric cooking apparatus according to claim 13, where the thermostat has a housing, the housing having a plurality of ridges to aid the user in grasping and manipulating the housing.

15. An electric cooking apparatus according to claim 10, wherein the lever is a pin hook.

16. An electric cooking apparatus according to claim 10, wherein the electric heater is a resistance heater.

17. An electric cooking apparatus according to claim 16, where the electric resistance heater is cast within the cooking plate.

18. An electric cooking apparatus according to claim 10, wherein the moveable door is slidable.

* * * * *